(12) United States Patent
Bacchiaz et al.

(10) Patent No.: US 7,218,202 B2
(45) Date of Patent: May 15, 2007

(54) BIOMETRIC KEY

(75) Inventors: John D. Bacchiaz, Pullenvale (AU); Robert Christensen, Chanhassen, MN (US)

(73) Assignee: Mu Hua Investment Limited, Hong Kong (HK)

( * ) Notice: Subject to any disclaimer, the term of this patent is extended or adjusted under 35 U.S.C. 154(b) by 910 days.

(21) Appl. No.: 09/764,729

(22) Filed: Jan. 17, 2001

(65) Prior Publication Data

US 2002/0059523 A1    May 16, 2002

(30) Foreign Application Priority Data

Nov. 16, 2000    (AU) .................................. 71544/00

(51) Int. Cl.
*E05B 27/00*    (2006.01)
(52) U.S. Cl. .......................... 340/5.52; 70/392; 70/406
(58) Field of Classification Search ............... 340/5.52, 340/426.14, 10.2, 5.53, 5.83, 825.69, 5.58, 340/5.25, 5.82, 5.81; 341/173; 713/200; 382/116; 200/341; 206/37.1; 70/4.8, 395, 70/278.7, 413
See application file for complete search history.

(56) References Cited

U.S. PATENT DOCUMENTS

| 4,947,662 | A | * | 8/1990 | Imedio | .......................... 70/395 |
| 5,055,658 | A | | 10/1991 | Cockburn | |
| 5,140,317 | A | * | 8/1992 | Hyatt | .......................... 340/5.25 |
| 5,311,757 | A | * | 5/1994 | Spahn | .......................... 70/408 |
| 5,337,588 | A | | 8/1994 | Chhatwal | |
| 5,592,169 | A | * | 1/1997 | Nakamura et al. | .......... 341/173 |
| 5,625,349 | A | | 4/1997 | Disbrow et al. | |
| 5,867,802 | A | | 2/1999 | Borza | |
| 5,915,936 | A | | 6/1999 | Brentzel | |
| 5,933,086 | A | | 8/1999 | Tischendrof et al. | .. 340/825.31 |
| 5,987,155 | A | | 11/1999 | Dunn et al. | |
| 6,078,265 | A | | 6/2000 | Bonder et al. | |
| 6,144,293 | A | | 11/2000 | Plaschko et al. | ............ 340/426 |
| 6,325,285 | B1 | | 12/2001 | Baratelli | |

FOREIGN PATENT DOCUMENTS

| DE | 198 23 731 | 12/1999 |
| EP | 0 472 495 | 2/1992 |
| EP | 913548 | 5/1999 |
| EP | 0 924 657 A2 | 6/1999 |
| EP | 0 926 457 A2 | 6/1999 |
| EP | 0 926 457 A3 | 9/1999 |
| JP | 2001237441 | 8/2001 |
| WO | WO09913434 | 3/1999 |
| WO | WO0042491 | 7/2000 |

\* cited by examiner

*Primary Examiner*—Wendy R. Garber
*Assistant Examiner*—Hung Q. Dang
(74) *Attorney, Agent, or Firm*—Akerman Senterfitt

(57) ABSTRACT

A biometric key having a key body incorporating a biometric sensor. There is also provided a receptor body for engagement with the biometric key, wherein the reader has a slot for retention of the key. When the key engages with the receptor body, a signal representing a biocode of data generated by the biometric sensor is forwarded to processing means for granting access to an authorised user to a facility accessible by the biometric key.

29 Claims, 9 Drawing Sheets

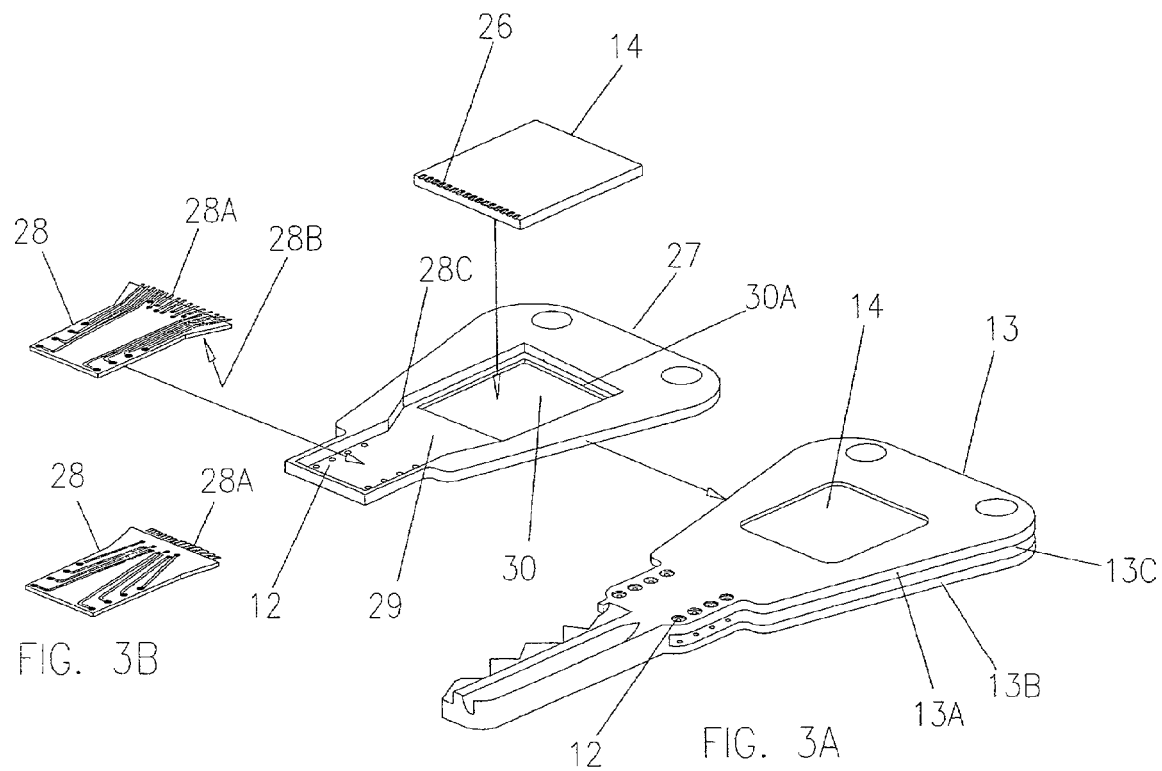
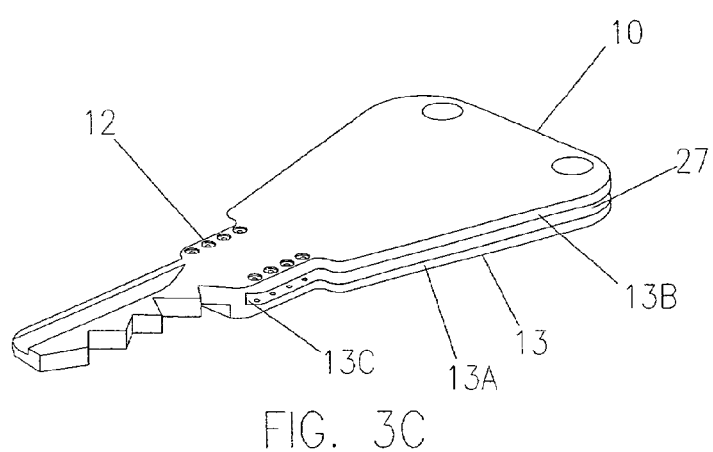

SECTION A-A

CONTACT DETAIL

SECTION B-B

CONTACT DETAIL

SECTION C-C

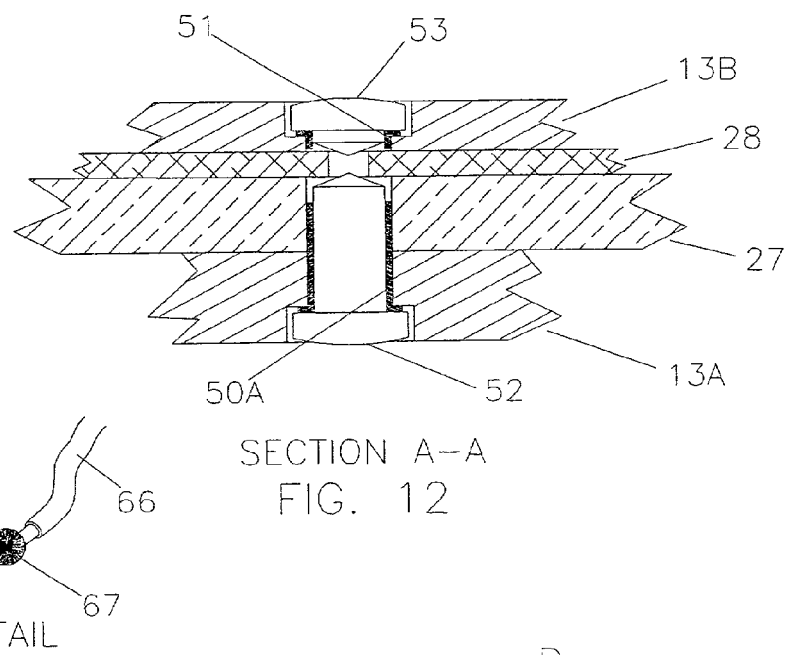
SECTION A-A
FIG. 12
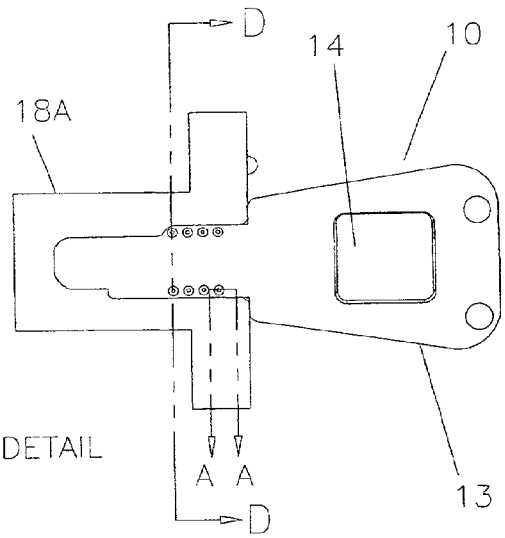
FIG. 11
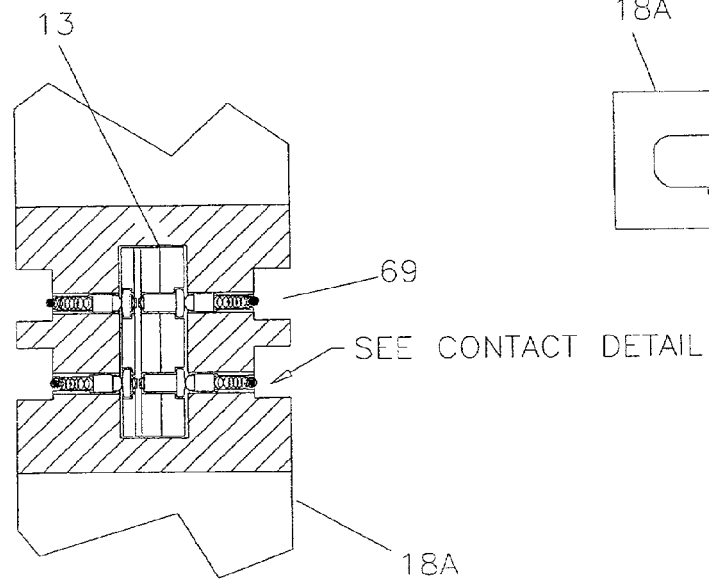
CONTACT DETAIL
FIG. 14
SECTION D-D
FIG. 13

BIOMETRIC KEY

FIELD OF THE INVENTION

THIS INVENTION relates to a biometric key and more particularly relates to a biometric key having a key body which contains a biometric sensor capable of capturing a key holder's biometric data and transmitting the data through the biometric sensor to a processor in order to validate authorised use of the key through biometric verification.

BACKGROUND OF THE INVENTION

Currently keys are used for a wide variety of applications that comprise a mechanical or electromechanical cipher, which carries coded information. One example of the latter is keys described in European Patent 472495 which has a specific mechanism located on opposed edges of the key which co-operates with a corresponding mechanism built into a mating lock cylinder before a locking system incorporating the lock cylinder may be opened.

While such keys are simple to use, it will be appreciated that the level of security is not high because there are no means currently available for verifying that the person using the key is an authorised user. This means that while a conventional mechanical or electromechanical lock operated by a key presents physical access to a building such a key may be readily copied or it may be lost or given to other persons who may then gain access to the building on an unauthorised basis. Thus, physical access to the building is provided by those in control of the key.

Conventional biometric control systems are well known and refer to encoding of a person's specific biometric features into a memory of the biometric control apparatus with an external process (e.g. storage memory, matching algorithm and return signal). A coded version of an authorised biometric feature can be stored. When verification is required, it is necessary for the user to present his biometric characteristic feature to the biometric control apparatus, which then compares the biometric characteristic feature with the authorised biometric feature. If a match occurs, then the biometric control system permits access to a facility controlled by the biometric control system.

Biometrically secured control systems for preventing unauthorised use of vehicles are described in U.S. Pat. No. 5,867,802. This reference describes a method and system for restricting use of a vehicle to person(s) whose fingerprints match biometric data stored within a memory in the control system of the vehicle. A user's digitised fingerprints are stored in a ROM in the BIOS of a microcontroller or in a ROM accessed by a microcontroller. The microprocessor's primary task is that of executing instructions, which are related to the operation of the vehicle such as regulation of the fuel flow rate, and other tasks. Before the microprocessor can execute its instructions related to the primary task, it must complete and exit a conditional loop of instructions that relate to validating the user's "real input" biometric data. Real scanned fingerprints must be compared with fingerprints(s) stored in ROM. If the result of the comparison is a match, then the operating loop is satisfied and the microprocessor can execute its instructions relating to operation of the vehicle. In U.S. Pat. No. 5,607,802 use is made of a conventional fingerprint scanning device and related circuitry coupled to the microprocessor. A key operated ignition switch is coupled to the microprocessor to provide a signal for providing power to the microprocessor before it may control operations related to the vehicle.

Another example of biometrically secured control systems is described in U.S. Pat. No. 5,915,936 which refers to a firearm which incorporates a pressure sensor for sensing grasping of a butt section of the firearm by a palm of the user as well as a scanning sensor for scanning a palm print of the user and generating a data signal representative of the scanned palm print after actuation of the pressure sensor. The firearm can only be used by authorised users wherein a memory unit stores data signals representative of the authorised users.

U.S. Pat. No. 5,987,155 refers to a biometric information input device having an integral smart card reader. The device provides co-operative operation of the smart card and the input device to provide user specific processing of biometric information provided by the user. Examples of biometric input devices referred to in this reference are those incorporating a microphone or those which comprise a contact imaging device such as a fingerprint scanner.

The abovementioned prior art references are illustrative of biometric control systems which can only be operated upon use of a vehicle ignition key as described in U.S. Pat. No. 5,867,802, a pressure sensor in the case of U.S. Pat. No. 5,915,936 or a smart card in the case of U.S. Pat. No. 5,987,155. It therefore will be appreciated that such conventional biometric control systems are non-versatile in being restricted to a specific application, and also require the use of additional structure relative to the specific application. Thus for example the biometric input device of U.S. Pat. No. 5,987,155 requires as an essential component a card slot for acceptance of the smart card.

It is an object of the present invention to provide a biometric key, which may reduce the disadvantages of the prior art, discussed above.

BRIEF SUMMARY OF THE INVENTION

The invention provides a biometric key, having a key body incorporating a biometric sensor for transmission of a signal representing a biocode of data generated by the biometric sensor, said key body in use engageable with a receptor body for interaction with the key body to forward the signal to processing means for granting access to an authorised user to a facility accessible by the biometric key.

The interaction between the key body and the receptor body may, for forwarding of the signal to the processing means, involve the use of electrical contacts, wherein the key body has one or more contacts as hereinafter described with touch mating contact(s) of the receptor body. However, such interaction may also involve a transmitter of the key interacting with a receiver of the receptor body and such interaction may be of an optical, infra-red, radio-frequency or fibre-optic nature.

The key body may be similar to a conventional key which unlocks mechanical locks wherein the key has a blade with a plurality of wards that co-operate with lock tumblers in a conventional manner to unlock the mechanical lock as hereinafter described. The key body may also have a handle or gripping part, which may have the biometric sensor, applied or attached thereto or embedded therein. Preferably the sensor is accommodated within a mating recess of the key body and is provided with contacts or pins forming one example of the contact means which may engage with a circuit board also accommodated within the key body. Preferably the sensor is surrounded by an insulator insert.

Alternatively the key body may omit wards and have a blade or end portion, which engages with a mating slot in the receptor body discussed above. In this embodiment the receptor body may interface with the processing means, whereby upon recognition of an authorised signal by the processing means, access to the facility may be provided.

The sensor may be a solid state sensor manufactured by Pollex or Siemens and the sensor may scan an appropriate biometric characteristic of the key holder. Alternatively the sensor may be manufactured by Thompson, Veridicon or Harris, which are all well known solid state manufacturers. The scanning sensor may be carried out using a number of techniques which may include capacitance, resistance, thermal imagery, structure geometry, bone structure or vein structure. Suitably the scanning sensor scans a fingerprint or thumb print.

The key body may also have embedded therein a smart card chip such as a wired logic chip also known as an "intelligent memory" chip, which has inbuilt logic. Embedded processor chips, added to the key body, may contain memory and local processor capabilities. The embedded processor chip, embedded within the key body, may be used to encrypt/decrypt data, which makes this type of biometric key a unique person identification key.

Examples of use of the biometric key of the invention may be as an ignition key of a vehicle, a key to a storage facility such as a drawer or lid of a box, a security facility such as a security door or security window, to operate an elevator or lift or to initiate actuation of an electric motor, hydraulic motor, engine or other form of drive means or even hydraulic or pneumatically actuated ram assemblies. Each of the foregoing are examples of facilities which may be accessible by the biometric key of the invention.

It therefore will be appreciated from the foregoing that the biometric key of the invention is extremely versatile having many applications or uses and also extremely simple in structure to at least partially overcome the disadvantages of conventional biometric control systems as described above. The biometric key of the invention also involves a high degree of security to overcome the problems of conventional keys as described above.

The invention also includes within its scope a receptor body engageable with a biometric key, said biometric key having a key body incorporating a biometric sensor for transmission of a signal representing a biocode of data generated by the biometric sensor, wherein said receptor body interacts with the key body to forward the signal to processing means for granting access to an authorised user to a facility accessible by the biometric key.

It will be appreciated from the illustrated embodiments hereinafter that the receptor body may comprise a lock component such as a lock cylinder as shown in FIGS. 1–10A or a stationary body forming part of a drawer or door as shown in FIGS. 11–19.

The invention also provides a security system for use with a facility to prevent unauthorised access to the facility which includes the biometric key as described above as well as the receptor body as described above.

The invention also relates to a method for providing access to a facility, which includes the steps of:

(i) inserting a key having a biometric sensor into a receptor body whereby upon engagement of the key with the receptor body a signal representing a biocode of data generated by the biometric sensor is forwarded to processing means;

(ii) matching the biocode with a database associated with the processing means to permit validation of the biocode; and (iii) providing access to a facility, which incorporates the receptor body, to an authorised person, when said validation has taken place.

DETAILED DESCRIPTION OF THE DRAWINGS

Reference may now be made to a preferred embodiment of the present invention as described in the accompanying drawings wherein:

FIG. 3A is an exploded perspective view of the key of FIG. 1 showing all parts thereof;

FIG. 3B is a perspective view of the circuit board shown in FIG. 1 from an opposite side;

FIG. 3C is a perspective view of the key shown in FIG. 3A from an opposite side;

FIG. 11 is a plan view of a biometric key of the invention inserted into a stationary receptor body in another embodiment of the invention;

FIG. 12 is a section through line A—A of FIG. 11;

FIG. 13 is a section through line D—D of FIG. 11;

FIG. 14 is a detailed view of a contact shown in FIG. 13;

DETAILED DESCRIPTION OF THE INVENTION

Figure 1:
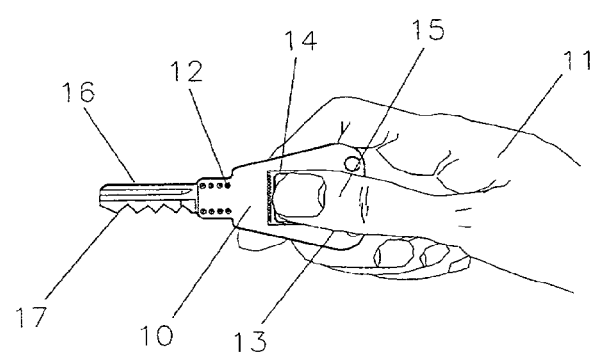
FIG. 1 is a view of the biometric key of the invention held in a person's hand.

In FIG. 1 there is provided a biometric key 10 of the invention held in the hand 11 having control portals 12. The key 10 has a key body 13 and a sensor 14 being contacted by thumb 15. The key 10 is also provided with blade 16 having wards 17.

Figure 2:
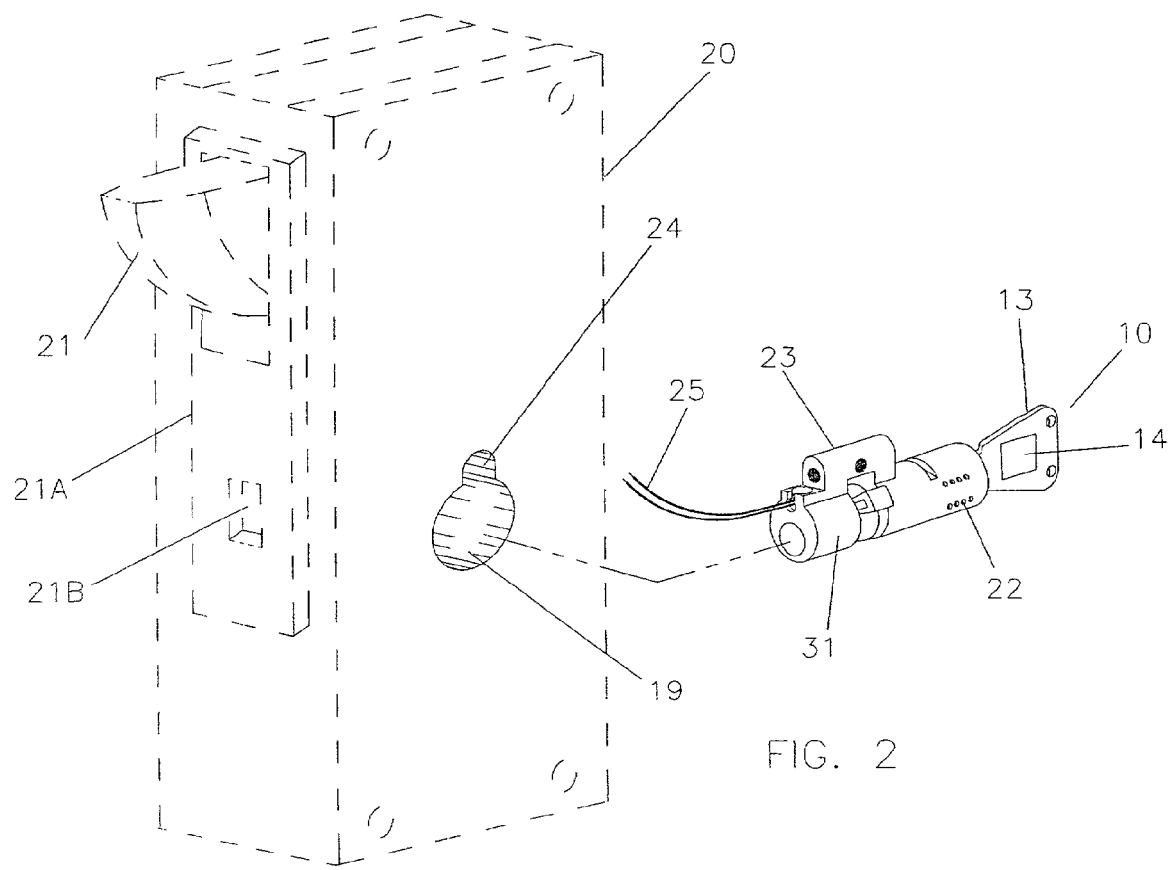
FIG. 2 is a perspective view of a biometric key of the invention, which is inserted into a corresponding lock barrel of a lock body.

In FIG. 2 the key 10 is shown inserted into lock barrel 31 which is fitted into mating aperture 19 of lock body 20 having lock tongue 21. The barrel 31 has contact portals 22 and also has upper component 23 which fits into mating recess 24. The barrel 31 is also provided with wires 25. The lock body 20 is of mechanical nature having a custom wire bus (not shown).

Figure 4A:
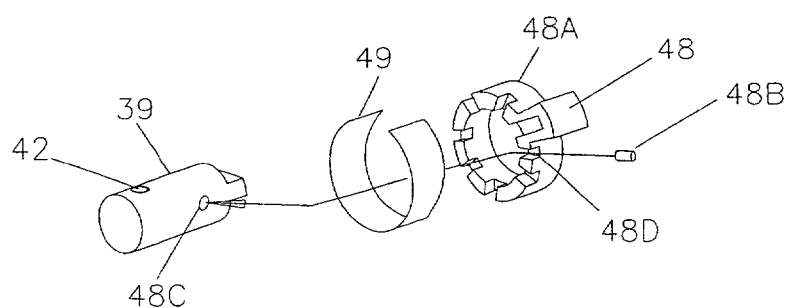
FIG. 4A is an exploded perspective view of components of the lock body shown in FIG. 4.

The lock body 20 incorporates a slider bar 21A having slot 21B for engagement with trigger latch 48 shown in FIG. 4A.

In FIGS. 3A and 3C the key 10 is shown having components in the form of the sensor 14, insulator insert 27 and circuit board 28 which fits into recess 29 of insulator insert 27. Insulator insert 27 is slidably attached to key body 13 and bonded thereto. The circuit board 28 is shown on both sides as is key body 13, which is formed from sensor 14, insulator insert 27 and circuit board 28 as illustrated. Sensor 14 fits within recess 30 of insulator 27 and, more specifically, is retained by retaining flange 30A of recess 30. The circuit board 28 has wire leads or contact traces 28A which bond or solder to corresponding tabs 26 on sensor 14. Circuit board 28 also has at the end adjacent wire leads 28A sloping side edges 28B, which engage with corresponding edges 28C of recess 29.

The key body 13 as shown in FIG. 3A and 3C also includes body plates or flanges 13A and 13B separated by a slot 13C of complementary shape to insulator insert 27 which receives insulator insert 27 as shown in FIG. 3A.

Figure 4:
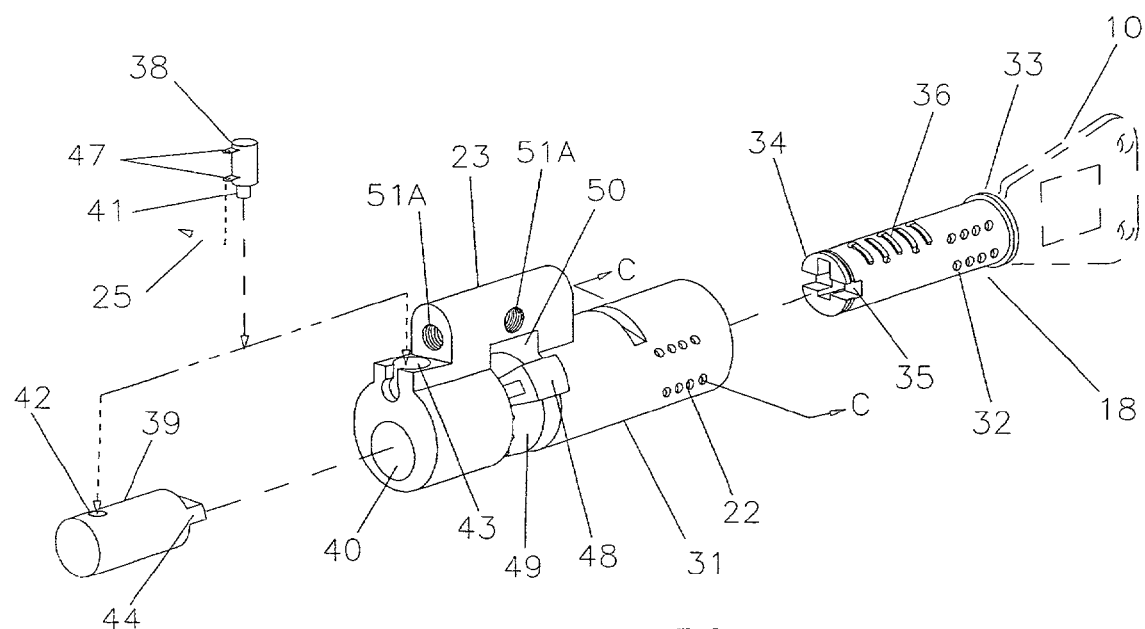
FIG. 4 is an exploded perspective view of components of a lock body comprising a lock cylinder and associated barrel.

In FIG. 4 the key 10 is shown fitted into a lock cylinder 18 having contact portals 32. The cylinder 18 has flange 33 and end 34 having a slot 35. The cylinder 18 also has tumblers 36.

Contact portals 32 touch mating contact portals 22, when cylinder 18 is inserted into lock barrel 31. The contact portals 22 transmit electronic signals with an external processor as hereinafter described through lock body 20. Alternatively, and more preferably, the contact portals 22 exchange electronic signals with an processing unit in lock body 20 which has an electronic interface with an external processor, such as a host computer, as described hereinafter. The electronic interface with the outside processor may be of any suitable type, such as USB, parallel, serial or IEEE 1384 firewire signals. This does not preclude conforming to IEEE 802.15 Wireless Personal Area Network (WPAN) including Bluetooth, HomeRF, HighRate RF and wide spectrum RF. The processing unit may also provide return electrical signals that control a linear motor or solenoid 38 which releases a cylindrical locking pin 39 which fits within bore 40 of cylinder 18. Motor 38 has a spring loaded piston 41, which engages with aperture 42 of locking pin 39. Motor 38 also fits within mating socket 43 of barrel 31. Locking pin 39 has projection 44, which engages with slot 35 of cylinder 18. Motor 38 also has contacts 47, which engage with wires 25. There is also provided trigger latch 48 of barrel 31, shown in the locked position and which is located on rotatable gear 48A shown in FIG. 4A which has a protective sheath 49. The trigger latch 48 engages with slot 50 in an unlocked position providing for maintenance of barrel 31. When unlocking of lock body 20 is initiated, piston 41 retracts within motor 38 thereby allowing locking pin 39 to rotate. There is provided a small pin 48B which interconnects locking pin 39 and gear wheel 48A as shown in FIG. 4A wherein pin 48B engages in hole 48C of locking pin 39 and also engages in a selected recess 48D of gear wheel 48A.

Latch 48 moves downwardly from the position shown in FIG. 4 to unlock tongue or latch plate 21 by engagement with slot 21B shown in FIG. 2. The upper component 23 of barrel 31 has screw threaded attachment holes 51A which facilitate attachment to lock body 20. It will also be appreciated that as referred to above lock 20 may incorporate a suitable processing unit (not shown) which includes suitable software and a database to match and validate biometric data in the form of a biocode provided by an electrical signal from sensor 14. The processing unit may also interface with a host computer, through which biocodes may be enrolled as described hereinafter. Wires 25 may be connected to the processing unit or to the host computer. The lock 20 body controls access in two different ways i.e. requiring a valid return signal from the processing unit to unlock the locking pin 39 as well as mechanical tumblers 36 adding further security.

Figure 6:
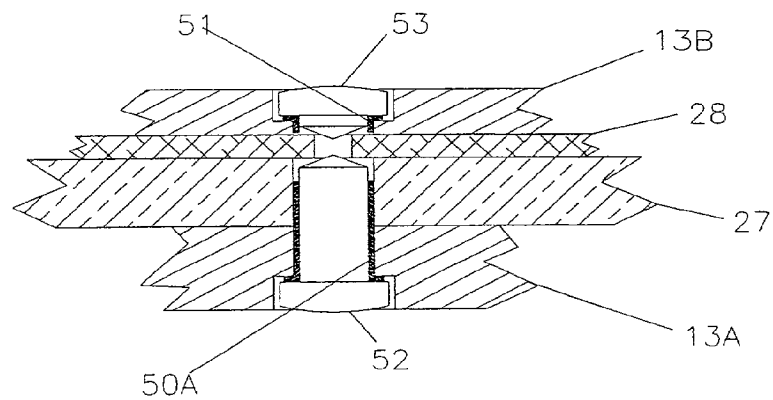
FIG. 6 is a section through line A—A of FIG. 5.
Figure 5:
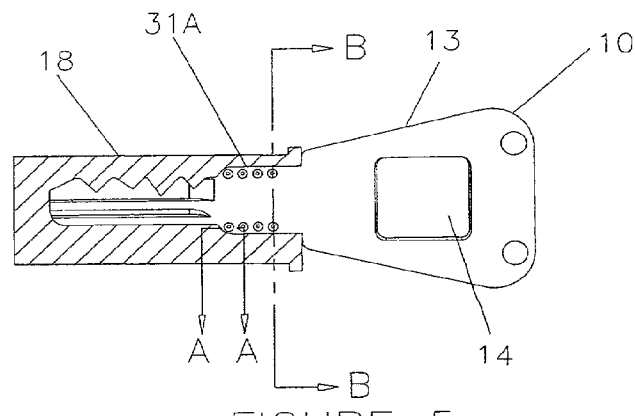
FIG. 5 is a plan view of the biometric key of the invention shown in FIG. 1 inserted in the lock cylinder.
Figure 6A:
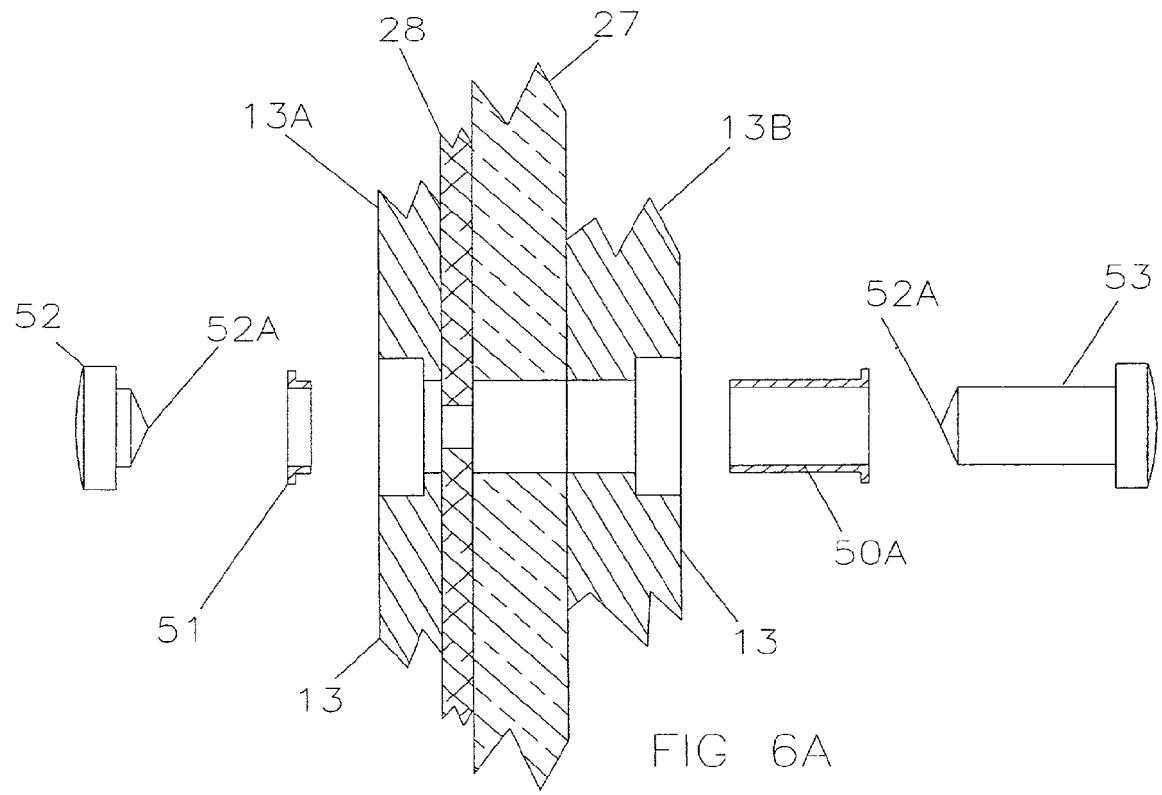
FIG. 6A is an exploded view of the components of FIG. 6.

FIG. 5 shows key 10 inserted into keyway or slot 31A of cylinder 18 and FIG. 6 is taken along line A—A of FIG. 5. In FIG. 6 there is shown individual insulators or insulator sleeves 50A and 51, which contact pins 52 and 53. A closer detail is shown in FIG. 6A which shows insulators 50A and 51 engaging in a press fit within key body 13 and contact pins 52 and 53 engaging within a press fit within mating insulators 50A and 51. Contact pins 52 and 53 each have a barbed point 52A, which drive into a solder puddle on circuit board 28. Insulators 50A and 51 are aligned normally to a longitudinal axis of key body 13.

Figure 8:
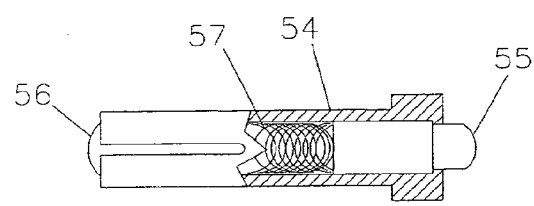
FIG. 8 is a detailed view of contact detail shown in FIG. 7.
Figure 7:
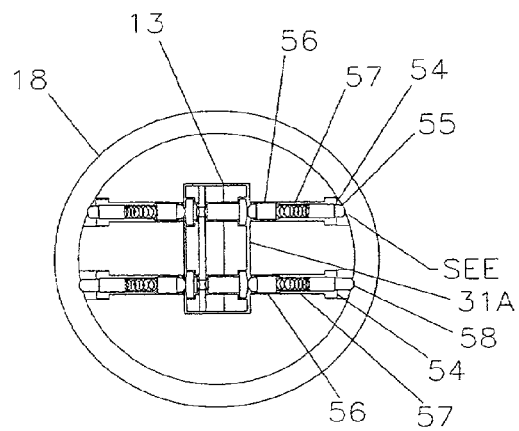
FIG. 7 is a section through line B—B of FIG. 5.
Figure 8A:
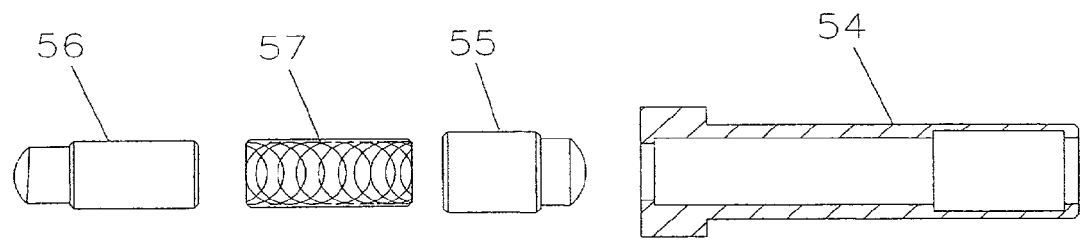
FIG. 8A is an exploded view of the components of FIG. 8.

FIG. 7 is taken along line B—B of FIG. 5. There is shown contact pin 55, which is a sliding fit within insulator 54, and fuzz button 57. The purpose of fuzz button 57 is to provide electrical continuity between contact pins 55 and 56 under the influence of its own spring pressure. Insulators 57 are shown aligned normally to the longitudinal axis of the key body 13. A closer detail of this arrangement is shown in FIG. 8. An exploded view is also shown in FIG. 8A.

Figure 10A:
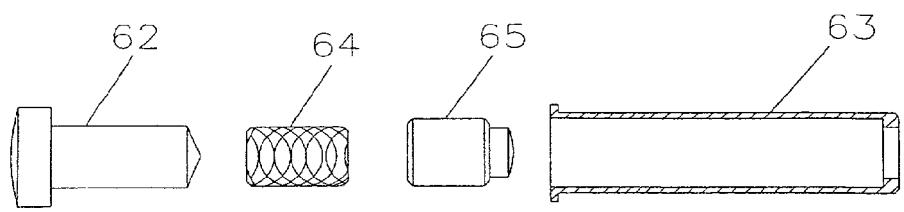
FIG. 10A is an exploded view of the components of FIG. 10.
Figure 10:
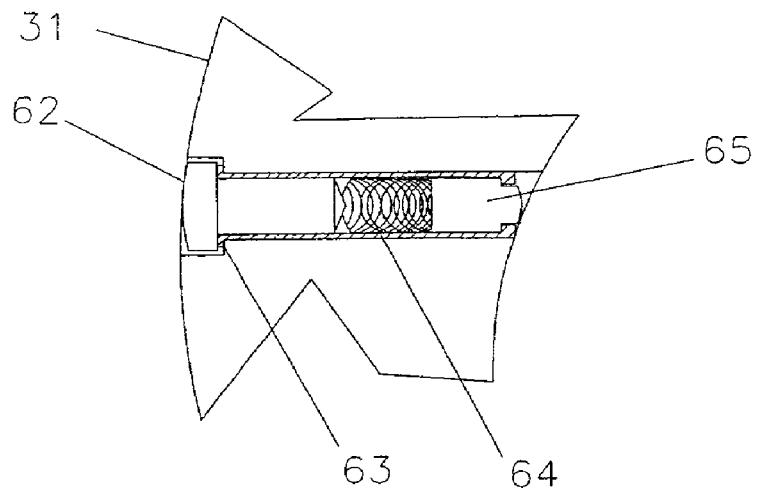
FIG. 10 is a detailed view of contact detail shown in FIG. 9.
Figure 9:
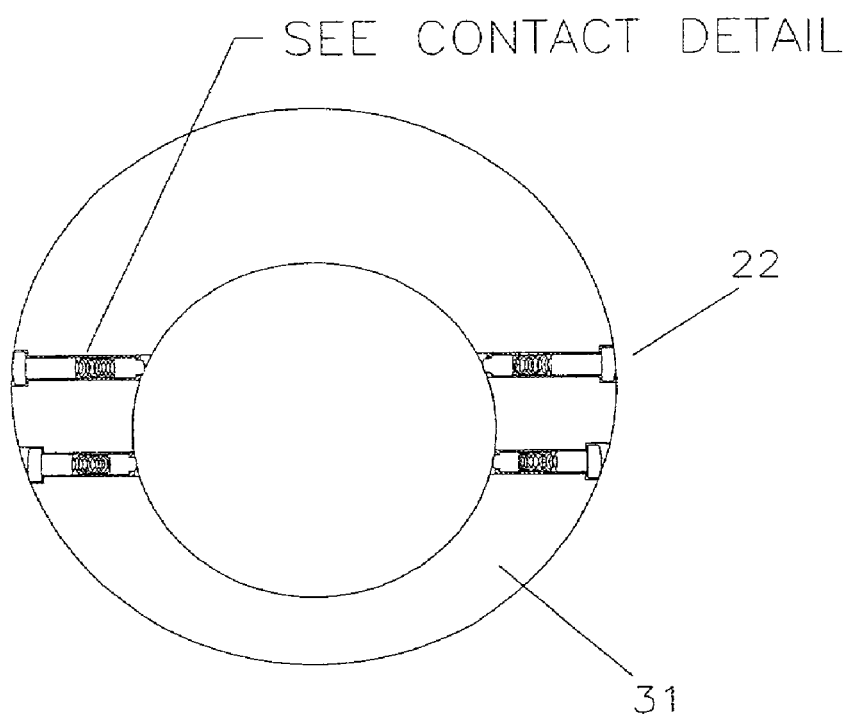
FIG. 9 is a section through line C—C of FIG. 4.

FIG. 9 is a section along line C—C of FIG. 4, a detailed view of the contact detail shown in FIG. 10, shows insulator 63 which is bonded within barrel 31, contact pin 62 adapted for press fit within insulator 63, fuzz button 64 and additional contact pin 65 which has a sliding fit within insulator 63. An exploded view is shown in FIG. 10A.

The processing unit may be operated in either a stand alone environment (platform independent) i.e. as described above or aided with a remote host computer connected by any suitable means including serial, parallel, or USB connection or IEEE 802.15 WPAN RF technology. The processing unit may comprise a Digital Signal Process (DSP) unit or ASIC processor. The processing unit captures and extracts a biocode of the fingerprint scanned by the biometric key. The biocode is a fingerprint map or digital signature that permits identity verification of a person. The extraction and matching algorithm is based upon minutiae comparison. The maximum size of a biocode in this particular context may be 254 bytes. The processing unit can manage up to 2048 biocodes in its own database or a remote host computer may manage the database if more biocodes are needed. In order to take full advantage of the features available, such as administrative reports and user queries, a remote computer may interface to the processing unit.

The processing unit may be a self-contained board using only an external power source, an interface to the biometric sensor, and a connection to the host computer. The processing unit may also contain on-board RAM, ROM, communications interface, fingerprint recognition software and database manager, all integrated into an optimised device. It is the task of the system integrator to fulfil the relevant specifications for the entire system operation.

There is a variety of enrolment means to enter a biocode into the processor database. The most common is the remote host computer via a suitable connection. A Smartcard Reader may also be used in conjunction with a 10-key pad to control the processing unit. There is a multitude of ways to initiate administrator functions in a stand alone environment.

The processing unit may also enrol biocodes directly to the point of origin via the key. Users are grouped into two categories: administrator and regular users. The administrator registers, checks and deletes the authorised people in the database.

Figure 16:
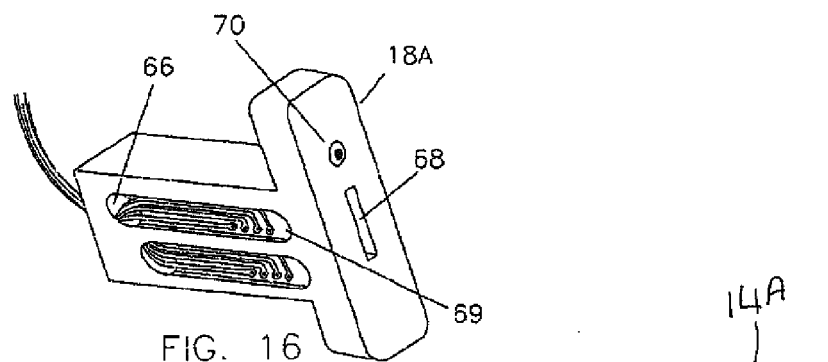
FIG. 16 is a perspective view of the receptor body barrel of FIG. 15 from another orientation.
Figure 15:
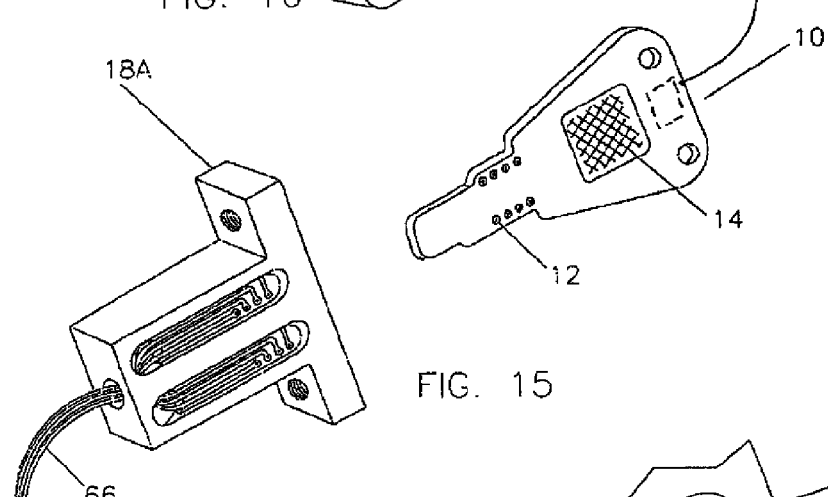
FIG. 15 is an exploded perspective view of the key of FIG. 11 separated from the receptor body.
Figure 17:
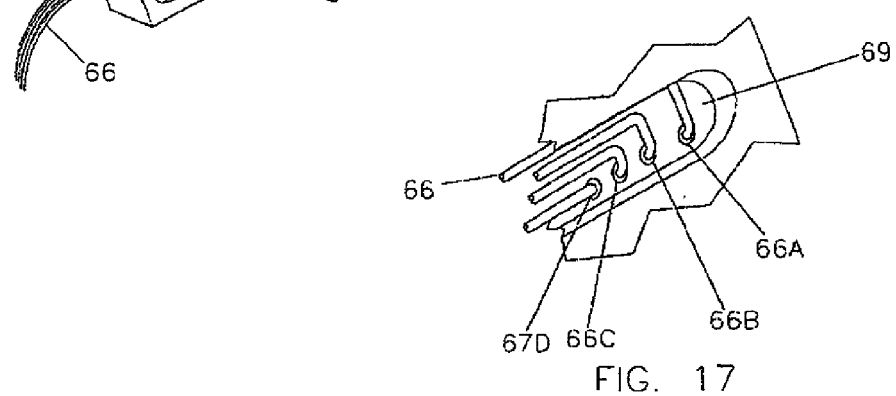
FIG. 17 is a detailed view of a contact shown in FIG. 15.

In FIG. 11, there is shown an alternative embodiment of the invention, wherein key 10 is fitted within a stationary receptor body 18A and lo electrical continuity is provided by FIGS. 12 and 13, which represent sections along lines A—A and D—D of FIG. 11 and which relevant contact detail is shown in a similar manner as shown in FIGS. 6 and FIG. 8. In FIG. 12 there is shown contact pins 52 and 53 which are bounded by insulators 50A and 51 as described previously. Contact pins 52 and 53 touch mating contacts 56 of receptor body 18A, which touch fuzz button 57. Wiring 66 is attached to fuzz button 57 by solder 67 as shown in FIG. 14. Key 10 is inserted in slot 68 of receptor body 18A as shown in FIG. 16. Wiring 66 is routed in wire access grooves 69, which are shown in FIGS. 13 and 17. Receptor body 18A is also provided with a light emitting diode 70, shown in FIG. 16, which is a visual signal for acceptance (i.e. green) or rejection of the signal (i.e. red). Wiring 66 has soldered points 66A, 66B, 66C and 67D as shown in FIG. 17.

Receptor body 18A may be mounted inside a drawer, box, housing of any security system whereby receptor body 18A may be wired to the processing unit (not shown) in the security system which requires access by biometric key 10. Thus in this embodiment there is no requirement of a mechanical or electromechanical lock body 20 as shown in the embodiment of FIGS. 1–10.

The sensor 14 may be obtained commercially from Siemens and is sold under the Registered Trade Mark FingerTip. It is sold as part of a module, which also includes a processing unit connected to the FingerTip sensor chip by a conductor and the module is marketed by Siemens under the Trade Mark TopSec 10—Module A1.0. The module reads out of the FingerTip sensor the biometric data, evaluates it and compares it to a database contained in the memory of the module. It is emphasised that it is only the sensor component that is utilised in the present invention and which is incorporated in key body 13 as described herein.

However, the processing unit from the module is an example of a suitable processing unit utilised in the present invention.

The key 10 may also include a smart card chip 14A shown on the opposite side as sensor 14. Of course it will be appreciated that smart card chip 14A may also be on the same side if desired.

It will also be appreciated that the invention may include within its scope the abovementioned receptor body in the form of lock cylinder 18 or stationary body 18A. The invention may also include the barrel 31 per se.

The smart card chip 14A may comprise an integrated circuit with ISO 7816 interface and/or a processor integrated circuit and/or a personal identity token containing IC-S.

Figure 18:
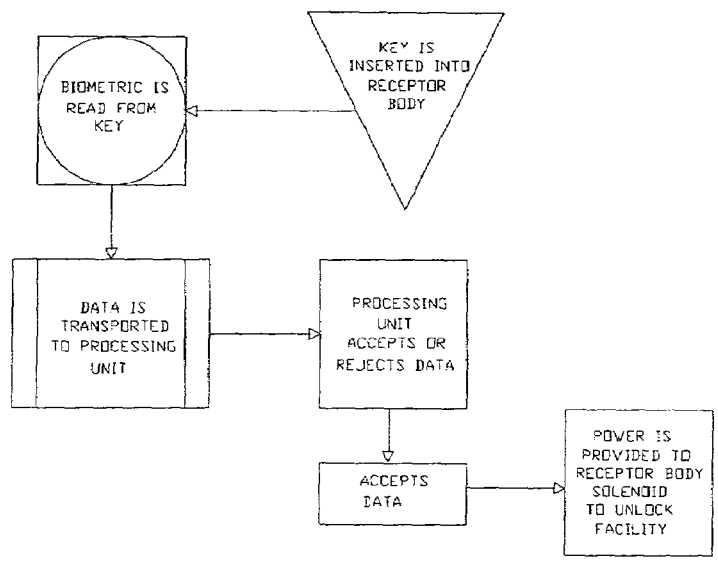
FIG. 18 is a block diagram describing the chain of events upon operation of the biometric key of the invention.

In FIG. 18 there is shown a block diagram representing the chain of events upon use of the biometric key of the invention wherein the following events take place, i.e.

(i) the key 10 or 10A is inserted into lock cylinder 18 or stationary receptor body 18A;

(ii) the key contacts make connection with the receptor body contacts;

(iii) power is provided to the sensor 14 in the key 10, via the receptor body 18 or 18A and the processing unit, from an external source;

(iv) a biometric is read through the sensor 14, and that data is passed through the key contacts and sent to the processing unit;

(v) the processing unit extracts biometric data signature, and compares to previously stored biometric data signature for match;

(vi) if a match exists, the external signal latches or unlatches (i.e. open/closed); and (vii) the key 10 is removed from the receptor body.

Figure 19:
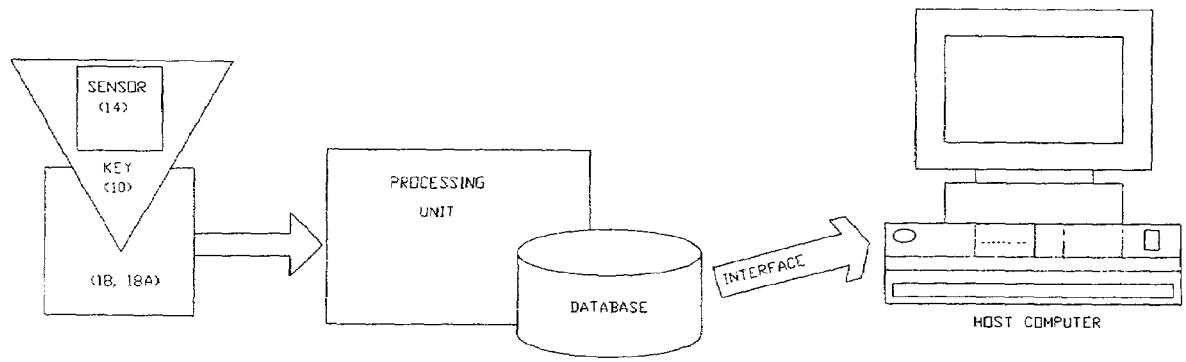
FIG. 19 is a schematic view showing enrolment of biometric data signature via an external host computer.

In FIG. 19 there is shown a schematic diagram how enrolment of biometric data signature may be accomplished via a host computer whereby:

(a) the host computer software requests personal and/or demographic information relative to the authorised user;

(b) the biometric data signature is captured from the sensor through the key, via the receptor body interfaced to the host computer;

(c) personal and/or demographic information is stored with biometric data signature and stored within database of the host computer;

(d) a search is performed against the database for previous enrolments (i.e. prevents multiple enrolments under assumed names);

(e) if not found, authorised user is enrolled into database;

(f) if found, enrolment is denied; and (g) database located on the processing unit and host computer database is updated to reflect new enrolment.

It will be appreciated from the foregoing that the biometric key of the invention is versatile in operation, has relatively simple structure and provides a high degree of security.

In a variation of the foregoing it will be appreciated that the key body may have inbuilt processor chip or processing unit instead of the processing unit being incorporated in the receptor body.

The invention claimed is:

1. A biometric key in the form of a mechanical key having:
 a key body incorporating a biometric sensor for transmission of a signal represented by a biocode of data generated by the biometric sensor,
 said key body engageable with a mechanical lock body and having one or more electrical contacts for engaging mating electrical contact(s) of the mechanical lock body,
 wherein in use said signal is forwarded to processing means interfaced with or electrically connected to the mechanical lock body for granting access to an authorized user to a facility accessible by the biometric key upon engagement of the key body with the mechanical lock body,
 wherein the sensor is surrounded by an insulator in the key body and is accommodated within a mating recess of the insulator, wherein the sensor is electrically connected to a circuit board associated with the insulator, the circuit board being electrically connected to said one or more contacts, and wherein the insulator is insertable into a slot of the key body and attached thereto.

2. A biometric key as claimed in claim 1, wherein the insulator is slidably attached to the key body and bonded thereto.

3. A biometric key as claimed in claim 1, wherein the circuit board is accommodated within a cavity of the insulator.

4. A biometric key as claimed in claim 1, wherein the circuit board at one end has contact traces or wire leads winch engage with corresponding contact traces of an adjacent end of the biometric sensor.

5. A biometric key as claimed in claim 1, wherein each contact is at least partly surrounded by an insulator sleeve.

6. A biometric key as claimed in claim 5, wherein the insulator sleeve is aligned normally to a longitudinal axis of the key body.

7. A biometric key as claimed in claim 1, wherein the key body has a handle or gripping part incorporating the biometric sensor and a blade portion.

8. A biometric key as claimed in claim 7, wherein the blade portion has a plurality of wards.

9. A biometric key as claimed in claim 7, wherein the blade portion has a shape of a plate and does not incorporate wards.

10. A biometric key as claimed in claim 1, wherein each contact comprises a pair of contact pins located in accommodating insulator sleeves.

11. A biometric key as claimed in claim 1, wherein the key body incorporates a smart chip.

12. A biometric key in the form of a mechanical key having a key body incorporating a biometric sensor for transmission of a signal represented by a biocode of data generated by the biometric sensor, said key body engageable with a mechanical lock body and having one or more electrical contacts for engaging mating electrical contact(s) of the mechanical lock body whereby in use said signal is forwarded to processing means interfaced with or electrically connected to the mechanical lock body for granting access to an authorized user to a facility accessible by the biometric key upon engagement of the key body with the mechanical lock body characterized in that the sensor is surrounded by an insulator in the key body and the sensor is electrically connected to a circuit board associated with the insulator which circuit board is electrically connected to said one or more contacts, wherein the insulator incorporates a plurality of contact portals in contact with corresponding contacts or wire leads of the circuit board.

13. A mechanical lock body engageable with a biometric key which incorporates a biometric sensor for transmission of a signal representing a biocode of data generated by the biometric sensor, said mechanical lock body having:

(i) a movable component or cylinder having one or more contact portals for engagement with corresponding contact(s) of the biometric key when said key is engaged with the movable component or cylinder; and (ii) a barrel for retention of said movable component having contact(s) for engagement with the contact portal(s) of the movable component or cylinder whereby in use the signal is forwarded to processing means interfaced or electrically connected with the barrel upon engagement of the biometric key with said movable component for automatic generation of the signal for granting access to an authorized user of a facility accessible by the biometric key, wherein after analysis of the signal by the processing means, access to the facility is provided by activation of a linear motor or solenoid located within the lock body which is in electrical connection with the processing means wherein said linear motor or solenoid is actuated to facilitate rotation of the moveable component or cylinder relative to the barrel to cause unlocking of the lock body, said rotation of the movable component or cylinder being caused by corresponding rotation of a locking pin within in the lock body which is due to actuation of the linear motor or solenoid.

14. A mechanical lock body as claimed in claim 13, wherein the barrel has a plurality of tumblers for engagement with a plurality of wards of said biometric key.

15. A mechanical lock body as claimed in claim 13, which incorporates an internal processing unit in said barrel, which corresponds to said processing means.

16. A mechanical lock body as claimed in claim 15, wherein the internal processing unit has an interface with an external processor or computer for enrolment of biometric data.

17. A mechanical lock body as claimed in claim 13, wherein each of the contacts contained in the movable component or cylinder are spring biased to a position in abutment with a corresponding contact of the biometric key.

18. A mechanical lock body as claimed in claim 17, wherein each of the contacts are normal to a longitudinal axis of the biometric key in use.

19. A mechanical lock body as claimed in claim 13, wherein there is incorporated in said body an indicator means indicating validation or rejection of biometric data generated by the sensor.

20. A mechanical lock body as claimed in claim 13, wherein the indicator means is a light emitting diode.

21. A mechanical lock body as claimed in claim 13, wherein said locking pins fits within a bore of the movable component or lock cylinder.

22. A mechanical lock body as claimed in claim 13, wherein said linear motor or solenoid has a spring loaded piston which fits within an aperture of the locking pin and also fits within a mating socket of the barrel.

23. A mechanical lock body as claimed in claim 13, wherein the locking pin has a projection which engages with a slot of the movable component or lock cylinder.

24. A mechanical lock body as claimed in claim 22 wherein the barrel has a trigger latch located on a rotatable gear whereby when unlocking of the mechanical lock body is initiated the spring loaded piston retracts within the electric motor or solenoid to allow the locking pin to rotate.

25. A mechanical lock body as claimed in claim 24 wherein the trigger latch engages with a slot in the barrel.

26. A mechanical lock body as claimed in claim 24 wherein there is provided a small pin which interconnects the locking pin and the rotatable gear wherein the small pin engages in a hole of the locking pin and also engages in a recess of the rotatable gear.

27. A mechanical lock body engageable with a biometric key which incorporates a biometric sensor for transmission of a signal representing a biocode of data generated by the biometric sensor, said mechanical lock body having:

(i) a movable component or cylinder having one or more contact portals for engagement with corresponding contact(s) of the biometric key when said key is engaged with the movable component or cylinder: and (ii) a barrel for retention of said movable component having contact(s) for engagement with the contact portal(s) of the movable component or cylinder whereby in use the signal is forwarded to processing means interfaced or electrically connected with the barrel upon engagement of the biometric key with said movable component for automatic generation of the signal for granting access to an authorized user of a facility accessible by the biometric key wherein each of the contacts are accommodated within an insulator, wherein within each insulator there is provided an inner contact for touching corresponding contacts of the biometric key in use and an outer contact separated from an adjacent inner contact by a spring.

28. A process for providing access to a facility which incorporates a movable part which includes the steps of:
(i) engaging a biometric key having a biometric sensor for transmission of a signal represented by a biocode of data generated by the biometric sensor, said key having one or more contacts with a receptor body operatively associated with or attached to said movable part whereby said contact(s) of the biometric key engage corresponding contacts of the receptor body whereby electrical power is provided to processing means interfaced with or electrically connected to the receptor body whereby the signal is generated by engagement of the biometric key with the receptor body and forwarded to the processing means which includes a processing unit having a database and said processing unit is interfaced with a host computer having a database;
(ii) matching the biocode with the database of the processing unit to permit validation of the biocode; and
(iii) providing access to the facility of an authorized user by causing movement of said movable part to an unlocked position,
wherein enrolment of an authorized biometric signature takes place by initial engagement of said biometric key with said receptor body and actuation of the biometric sensor for automatic generation of a signal representing said biocode of data which represents said authorized biometric signature which is then captured into said database of the processing unit and wherein the host computer requests personal and/or demographic information relative to the authorized biometric signature before said capture of the authorized biometric signature.

29. A process as claimed in claim 28, wherein the personal and/or demographic information is stored with biometric signature(s) in the database of the host computer and a search is made of this database for previous enrolments before the authorized biometric signature is enrolled in the host computer database as a new enrolment and subsequently the database of the processing unit and the host computer database is updated to reflect the new enrolment.

* * * * *

UNITED STATES PATENT AND TRADEMARK OFFICE
CERTIFICATE OF CORRECTION

| | | |
|---|---|---|
| PATENT NO. | : 7,218,202 B2 | Page 1 of 1 |
| APPLICATION NO. | : 09/764729 | |
| DATED | : May 15, 2007 | |
| INVENTOR(S) | : Bacchiaz et al. | |

It is certified that error appears in the above-identified patent and that said Letters Patent is hereby corrected as shown below:

Title page, item [30] "Foreign Application Priority Data" replace "71544/00" with --71644/00--

Column 1, line 62, replace "5,607,802" with --5,867,802--

Column 5, line 41, replace "with an processing" with --with a processing--

Column 7, line 18, replace "body 18A and lo electrical" with --body 18A and electrical--

Claim 20, replace "as claimed in claim 13" with --as claimed in claim 19--

Claim 27, line 8 (column 10, line 67), replace "cylinder:" with --cylinder;--

Signed and Sealed this

Second Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,218,202 B2  Page 1 of 1
APPLICATION NO. : 09/764729
DATED : May 15, 2007
INVENTOR(S) : Bacchiaz et al.

It is certified that error appears in the above-identified patent and that said Letters Patent is hereby corrected as shown below:

Title page, item [30] "Foreign Application Priority Data" replace "71544/00" with --71644/00--

Column 1, line 62, replace "5,607,802" with --5,867,802--

Column 5, line 41, replace "with an processing" with --with a processing--

Column 7, line 18, replace "body 18A and lo electrical" with --body 18A and electrical--

Column 10, Claim 20, line 40, replace "as claimed in claim 13" with --as claimed in claim 19--

Claim 27, line 8 (column 10, line 67), replace "cylinder:" with --cylinder;--

This certificate supersedes the Certificate of Correction issued September 2, 2008.

Signed and Sealed this

Thirtieth Day of September, 2008

JON W. DUDAS
*Director of the United States Patent and Trademark Office*